United States Patent
Stauth et al.

(10) Patent No.: US 9,793,794 B2
(45) Date of Patent: Oct. 17, 2017

(54) SYSTEM AND METHOD FOR REDUCING POWER LOSS IN SWITCHED-CAPACITOR POWER CONVERTERS

(71) Applicant: The Trustees of Dartmouth College, Hanover, NH (US)

(72) Inventors: Jason T. Stauth, Hanover, NH (US); Kapil Kesarwani, Lebanon, NH (US)

(73) Assignee: THE TRUSTEES OF DARTMOUTH COLLEGE, Hanover, NH (US)

( * ) Notice: Subject to any disclaimer, the term of this patent is extended or adjusted under 35 U.S.C. 154(b) by 0 days.

(21) Appl. No.: 15/116,780

(22) PCT Filed: Feb. 4, 2015

(86) PCT No.: PCT/US2015/014422
§ 371 (c)(1),
(2) Date: Aug. 4, 2016

(87) PCT Pub. No.: WO2015/120023
PCT Pub. Date: Aug. 13, 2015

(65) Prior Publication Data
US 2016/0352218 A1 Dec. 1, 2016

Related U.S. Application Data

(60) Provisional application No. 61/935,384, filed on Feb. 4, 2014.

(51) Int. Cl.
*H02M 3/07* (2006.01)
*H02M 1/08* (2006.01)
*H02M 1/00* (2006.01)

(52) U.S. Cl.
CPC .............. *H02M 3/07* (2013.01); *H02M 1/08* (2013.01); *H02M 2001/0058* (2013.01); *H02M 2003/072* (2013.01); *Y02B 70/1491* (2013.01)

(58) Field of Classification Search
CPC .. H02M 3/07; H02M 1/08; H02M 2001/0058; H02M 2003/072; Y02B 70/1491
(Continued)

(56) References Cited

U.S. PATENT DOCUMENTS 6,172,550 B1 * 1/2001 Gold ...................... H03K 17/92
327/110
7,598,792 B2 * 10/2009 Liu .......................... H02M 1/08
327/494
(Continued)

FOREIGN PATENT DOCUMENTS

WO 2013086445 A1 6/2013

OTHER PUBLICATIONS

PCT/US2015/014422 International Search Report & Written Opinion mailed May 14, 2015, 9 pages.
(Continued)

*Primary Examiner* — Brandon S Cole
(74) *Attorney, Agent, or Firm* — Lathrop Gage LLP

(57) ABSTRACT

A system for reducing power loss in a switched-capacitor converter includes a first and second switched capacitor sub-converter each having a flying capacitor and a first, second, third, and fourth switching device. Each switching device is controlled by one of a first, second, third, and fourth clock signal. The first, second, third and fourth clock signals of the second switched capacitor sub-converter are inverted such that the first switched capacitor sub-converter operates during a first phase and the second switched capacitor converter operates during a second phase that is 1800 degrees out of phase from the first phase. The system also includes a resonant charge sharing portion for coupling a bottom-plate parasitic capacitance of the first switched capacitor sub-converter to a bottom-plate parasitic capacitance of the second switched capacitor converter.

11 Claims, 8 Drawing Sheets

(58) Field of Classification Search
USPC .............. 327/148, 157, 530, 534–543, 546, 327/365–508; 363/59, 60; 323/312–317
See application file for complete search history.

(56) References Cited

U.S. PATENT DOCUMENTS

| | | | |
|---|---|---|---|
| 7,812,579 B2 | 10/2010 | Williams | |
| 8,395,438 B2 | 3/2013 | Dennard et al. | |
| 9,318,974 B2* | 4/2016 | Yoscovich | H02M 7/537 |
| 2008/0094866 A1 | 4/2008 | Bauman et al. | |
| 2008/0239772 A1* | 10/2008 | Oraw | H02M 3/07 |
| | | | 363/60 |
| 2009/0237042 A1* | 9/2009 | Glovinski | H02M 1/34 |
| | | | 323/235 |
| 2010/0214014 A1* | 8/2010 | Dennard | H02M 3/07 |
| | | | 327/541 |
| 2013/0106381 A1 | 5/2013 | Marsili | |
| 2013/0147273 A1 | 6/2013 | Van Der Lee et al. | |

OTHER PUBLICATIONS

Andersen et al. A 4.6 W/mm2 Power Density 86% Efficiency On-Chip Switched Capacitor DC-DC Converter in 32nm SOI CMOS. 28th Applied Power Electronics Conference and Exposition (APEC 2013), Long Beach, California, USA, Mar. 17-21, 2013 [retrieved on Mar. 30, 2015]. Retrieved from the internet: <https://www.pes.ee.ethz.ch/uploads/tx_ethpublications/3_A_4.6wmm_Power_Density_APEC2013_01.pdf>.

* cited by examiner

SYSTEM AND METHOD FOR REDUCING POWER LOSS IN SWITCHED-CAPACITOR POWER CONVERTERS

CROSS-REFERENCE TO RELATED APPLICATIONS

This application is a 35 U.S.C. §371 filing of International Application No. PCT/US2015/014422, filed Feb. 4, 2015, which claims the benefit of priority of U.S. Provisional Patent Application Ser. No. 61/935,384, filed Feb. 4, 2014, which is incorporated herein by reference in its entirety.

BACKGROUND

This invention relates to switched-capacitor power converters, and particularly to systems and methods for reducing power loss therein.

Power converters are widely used in a range of electronic and electro-mechanical systems to efficiently process and deliver energy where the energy source may supply power at one voltage level and the load requires a substantially different voltage level. Efficient power converters use switching techniques and energy storage components such as capacitors or inductors to transform voltage and current levels to the levels required by the load. For example, a microprocessor may operate at 1 V and 100 A, but the system power bus or battery provides a 12 V supply. A power converter, in this case a DC-DC converter, is needed to transform the 12 V supply to a 1 V supply that can be used by the microprocessor.

Switched-capacitor (SC) DC-DC converters have gained prominence in recent years due to several favorable characteristics. One advantage of SC converters is that they provide better utilization of semiconductor switching devices (such as MOSFETS) compared to inductor-based topologies (such as buck or boost converters). This is especially true in situations where the ratio of the supply voltage to the required output voltage (also known as the conversion ratio) is high. Specifically, the advantage of SC topologies is the ability to operate with lower conduction loss (power loss that occurs due to the flow of electrical current) for a given voltage-current (V-A) current rating of the power devices.

Additional trends that favor SC converters are the inherently higher energy-density (defined as the maximum energy storage a component can achieve divided by the component's area or volume) of capacitors compared to inductors in many voltage and current ranges. The energy-density of capacitors that can be integrated in integrated circuits using semiconductor microfabrication techniques is considerably higher than can be achieved using integrated inductors and other magnetic components. Also, new microfabrication techniques have enabled much higher energy density compared to what was available in traditional semiconductor processes.

A primary source of energy loss in switched-capacitor converters is 'bottom-plate' switching loss that is associated with the bottom-plate parasitic capacitance of the switched capacitor energy storage element. The 'bottom-plate' can be characterized by parasitic capacitance that is reference to a fixed common voltage (for example to ground).

FIG. 1 depicts an exemplary prior art 2:1 switched-capacitor converter 100. Switched-capacitor converter 100 includes a supply ($V_{in}$) 102, a load determined based on $V_{out}$ 104 and $I_{out}$ 106, a plurality of bypass capacitances ($C_{bypass}$) 108, a flying capacitance (Cx) 110, and a bottom-plate parasitic capacitance (Cbp) 116. The bottom-plate parasitic capacitance is shown in FIG. 1 for a 2:1 switched capacitor converter. Supply/$V_{in}$ 102 represents the power supply or energy source. $I_{out}$ 106 represents the load current with power delivered to the load being the product of $V_{out}$ 104 times $I_{out}$ 106. $C_{bypass}$ 108(1) represents bypass capacitance that is used to filter the input and output voltage levels (it should be noted that bypass capacitance is not needed in all cases, for example, the architecture reported in H. Le, S. R. Sanders, E. Alon, "Design Techniques for Fully Integrated Switched-Capacitor DC-DC converters," IEEE J. Solid-State Circuits, 2011, vol. 46, no. 9, pp. 2120-2131. Cx 110 represents the switched capacitance or flying capacitance that is used to move energy from the supply to the load, Cbp 116 represents the bottom-plate parasitic capacitance of the flying capacitance. Cbp 116 can represent parasitic capacitance of either terminal of Cx 110 to any substantially constant (common) voltage, but it is most common that the 'bottom' plate of the Cx 110 is physically closer to a ground-plane or a semiconductor substrate, which is why it is referred to as the "bottom-plate."

FIG. 2 depicts an exemplary prior art physical representation 200 of a flying capacitor Cx 110, of FIG. 1. FIG. 2 illustrates Cx 110, of FIG. 1 characterized as two parallel conductors (i.e. top plate 202 and bottom-plate 204) separated by a dielectric 206. The parasitic capacitances Cbp 116 and Ctp 216 are shown as the capacitance between either of the plates 202, 204 and a common voltage plane 210 that may be the substrate of a semiconductor chip, or a fixed voltage plane such as a ground plane. As the bottom-plate 204 is typically closer to the semiconductor substrate in integrated-circuit implementations, Cbp 116 tends to be the dominant parasitic. However, Ctp 216 may also be an important loss mechanism, and the loss mitigation strategy described herein applies equally to Cbp 116 and Ctp 216, as these can typically be lumped into a single common-mode capacitance.

Switched-capacitor converters operate by reconfiguring (or switching) the configuration of the flying capacitor with respect to different voltage nodes in the system. For example, in the 2:1 converter shown in FIG. 1, in phase 1, Cx 110 is connected in parallel with $V_{in}$ 102 and $V_{out}$ 104 through MOSFET switches 112(2), 112(4) that are controlled by voltages VB and VD, respectively. In phase 1, MOSFET switches 112(1), 112(3), controlled by voltages VA and VC, respectively, are substantially 'off' or in high impedance mode. During this time, charge flows into Cx 110 such that it stores energy substantially equal to:

$$E_{C_x-\varphi_1} = \frac{1}{2}C_x(V_{in} - V_{out})^2 \qquad \text{Equation [1]}$$

In phase 2, Cx 110 is reconfigured to be in parallel with $V_{out}$ and GND 114. At the end of phase 2, Cx 110 is storing energy according to:

$$E_{C_x-\varphi_1} = \frac{1}{2}C_x(V_{out} - GND)^2 \qquad \text{Equation [2]}$$

If there is a voltage difference between quantities ($V_{in}$−$V_{out}$) and ($V_{out}$−GND), net energy will flow in the direction where the voltage difference is lower. For example, if $V_{out}$ 104 is less than ($V_{in}$ 102)−($V_{out}$ 104), energy will flow to $V_{out}$ 104.

FIG. 3 depicts a common representation 300 for the SC voltage conversion process. The operation of a SC converter with an N:1 conversion ratio, as depicted in FIG. 3, can be represented as an N:1 transformer with series-connected output resistance, $R_{EFF}$. The transformer captures the efficient voltage and current transformation process, and $R_{EFF}$ captures the conduction losses in the system. Analytical expressions for $R_{EFF}$ have been derived for different conversion ratios and operating regimes. The simplest expression is derived using the energy balance description discussed above. In this case, $R_{EFF}=1/(f_{sw}C_x)$, where $f_{sw}$ is the switching frequency and $C_x$ is the flying capacitance. This expression is accurate for switching frequencies where the reactance of the flying capacitor is the dominant impedance in the circuit. This has been described as the "slow-switching limit." As switching frequency increases, the energy transferred into the flying capacitor in each phase may be limited by either 'effective series resistance' (ESR), or 'effective series inductance' (ESL). ESR or $R_{ESR}$ results from parasitic resistance of capacitors, metal interconnect, and semiconductor switches. ESL results from parasitic inductance in the loop containing flying capacitor(s), bypass capacitor(s), interconnect, and switches.

FIG. 4 is a prior-art graph depicting effective resistance normalized to effective series resistance versus frequency for switched-capacitor and resonant switched-capacitor (ReSC) converters. FIG. 4 depicts the normalized quantity $R_{EFF}/R_{ESR}$ for a 2:1 switched capacitor converter (does not include ESL). At low frequencies the converter operates in the SSL mode. At high frequencies, the minimum achievable $R_{EFF}$ is limited by $R_{ESR}$. It is important to minimize $R_{EFF}$ to also minimize power loss (maximize efficiency and minimize conduction losses), and so that $V_{out}$ is substantially equal to $V_{in}/N$. However, it can be seen that to minimize $R_{EFF}$, the SC circuit must switch faster. This causes increasing switching losses, or losses that are proportional to switching frequency. Switching losses include power loss required to switch the power semiconductor devices and also any frequency dependent losses from reconfiguring the flying capacitor, such as bottom-plate switching loss.

Bottom-plate switching losses occur due to losses in switching the bottom-plate parasitic capacitance between $V_{out}$ and GND every switching cycle. For example, using the description above with reference to FIG. 1, Cbp is connected in parallel with $V_{out}$, storing energy according to the following:

$$E_{C_{bp}-\varphi_1} = \frac{1}{2} C_{bp}(V_{out})^2 \quad \text{Equation [3]}$$

In phase 2, the bottom-plate is shorted out with both terminals connected to GND, so that its net energy storage becomes zero. This results in power loss of:

$$P_{C_{bp}} = C_{bp}(V_{out})^2 f_{SW} \quad \text{Equation [4]}$$

Bottom-plate parasitic capacitance is usually characterized through "bottom-plate-ratio" which is the ratio of bottom-plate parasitic capacitance to flying capacitance. It has further been shown that for a bottom-plate-ratio of 1%, the maximum achievable efficiency for a 2:1 switched-capacitor converter is 90.9%.

FIG. 5A depicts a prior art charge recycling system 500 for a multi-phase switched-capacitor converter. Within system 500, a first switched capacitor sub-converter 502 and second switched capacitor sub-converter 504 operate at 180 degrees out of phase. Each of the switched capacitor sub-converter 502, 504 include a first transistor 506(1), 508(1) a second transistor 506(2), 508(2) a third transistor 506(3), 508(3) and a fourth transistor 506(4), 508(4). Within first switched capacitor sub-converter 502, first transistor 506(1) has a source connected to $V_{in}$ and a gate connected to a first clock signal (clk1) 510(1), and a drain connected to a drain of second transistor 506(2). The gate of second transistor 506(2) is connected to a second clock signal (clk2) 510(2), and the source of second transistor 506(2) is connected to the source of third transistor 506(3). The gate of third transistor 506(3) is connected to a third clock signal (clk3) 510(3), and the source of third transistor 506(3) is connected to the source of fourth transistor 506(4). The gate of fourth transistor 506(4) is connected to a fourth clock signal (clk4) 510(4), and the drain of fourth transistor 506(4) is connected to ground (GND). In the embodiment shown within FIG. 5, the first and third transistors, 506(1), 506(3) are p-channel MOSFETS, and the second and fourth transistors 506(2), 506(4) are n-channel MOSFETS. First switched capacitor sub-converter 502 further includes a flying capacitor (C) 518 connected to the drain of first transistor 506(1) and the drain of third transistor 506(3). First switched capacitor sub-converter 502 further includes bottom-plate parasitic capacitance ($C_{bp1}$) 514 connected between ground and the drain of third transistor 506(3).

Within second switched capacitor sub-converter 504, first transistor 508(1) has a source connected to $V_{in}$ and a gate connected to inverted, via an inverter 512, second clock signal (clk2) 510(2), and a drain connected to a drain of second transistor 508(2). The gate of second transistor 508(2) is connected to inverted first clock signal (clk1) 510(1), via an inverter 512, and the source of second transistor 508(2) is connected to the source of third transistor 508(3). The gate of third transistor 508(3) is connected to inverted, via an inverter 512, fourth clock signal (clk4) 510(4), and the source of third transistor 508(3) is connected to the source of fourth transistor 508(4). The gate of fourth transistor 508(4) is connected to inverted, via an inverter 512, third clock signal (clk3) 510(3), and the drain of fourth transistor 508(4) is connected to ground (GND). In the embodiment shown within FIG. 5, the first and third transistors, 508(1), 506(3) are p-channel MOSFETS, and the second and fourth transistors 506(2), 508(4) are n-channel MOSFETS. Second switched capacitor sub-converter 504 further includes a flying capacitor (C) 520 connected to the drain of first transistor 508(1) and the drain of third transistor 508(3). Second switched capacitor sub-converter 504 further includes a bottom-plate parasitic capacitance ($C_{bp1}$) 516 connected between ground and the drain of third transistor 508(3)

System 500 utilizes interleaved first and second switched capacitor sub-converters 502, 504. For example two identical SC converters operate 180 degrees out of phase (phase 1 and phase 2 from the above description are reversed for each SC stage). In between phase 1 and phase 2, consider that Cbp1 514 is charged to $V_{out}$ and $C_{bp2}$ 516 is charged to 0 V. A switch (Scr) 522 is turned on to share the bottom-plate charge from Cbp1 514 to $C_{bp2}$ 516. If these capacitors are equal in magnitude, then after the end of the charge recycling phase, the voltage on $C_{bp1}=C_{bp2}\sim V_{out}/2$. Then in the next phase $C_{bp2}$ 516 only needs to be charged from $V_{out}/2$ to $V_{out}$, which reduces bottom-plate loss by up to 50%. While this is a valuable approach, it is limited by only recovering 50% of the bottom-plate power loss.

FIG. 5B illustrates an exemplary gate driver circuit 550 for generating signals clk1 through clk4 in order to drive the charge recycling system 500, of FIG. 5A. Gate driver circuit 550 operates for example as described in FIG. 6 of T. M. Anderson, F. Krismer and J. W. Kolar "A 4.6 W/mm² power density 86% efficiency on-chip switched capacitor DC-DC converter in 32 nm SOI CMOS", Proceedings of the International Solid-State Circuits Conference (ISSCC 2013), San Francisco, USA, Feb. 17-21, 2013.

FIG. 6 depicts a timing diagram 600 of signal waveforms for the charge sharing schematic of FIG. 5. Here $clk_3$ and $clk_4$ transition between GND and $V_{out}$. Signals $clk_1$ and $clk_2$ (not shown) would be synchronized with $clk_3$ and $clk_4$ respectively but would transition between VDD and $V_{out}$. When $clk_3$ is high and $clk_4$ is low, all switches are "off" and in a high impedance state. At this time, $clk_{cr}$ transitions high, connecting $C_{bp1}$ and $C_{bp2}$. Charge is transferred between these capacitors as indicated by the voltages across them (Vcb1 and Vcp2 respectively). Then when $clk_3$ transitions low, the amount of charge needed to charge $C_{bp1}$ to $V_{out}$ is $(V_{out}/2) \cdot C_{bp1}$, which reduces power loss by roughly ½ in ideal circumstances.

The above described multi-phase switched-capacitor converters lack in efficiency. For example, there is still appreciable loss to the bottom-plate parasitic capacitance elements as the prior art charge recycling scheme is limited to only recovering 50 percent of the bottom-plate power loss.

SUMMARY OF THE INVENTION

In one aspect, a system for reducing power loss in a switched-capacitor converter includes a first and second switched capacitor sub-converter each having a flying capacitor and a first, second, third, and fourth switching device. Each switching device is controlled by one of a first, second, third, and fourth clock signal. The first, second, third and fourth clock signals of the second switched capacitor sub-converter are inverted such that the first switched capacitor sub-converter operates during a first phase and the second switched capacitor converter operates during a second phase that is 180 degrees out of phase from the first phase. The system also includes a resonant charge sharing portion for coupling a bottom-plate parasitic capacitance of the first switched capacitor sub-converter to a bottom-plate parasitic capacitance of the second switched capacitor converter.

DETAILED DESCRIPTION OF THE DRAWINGS

Figure 7:
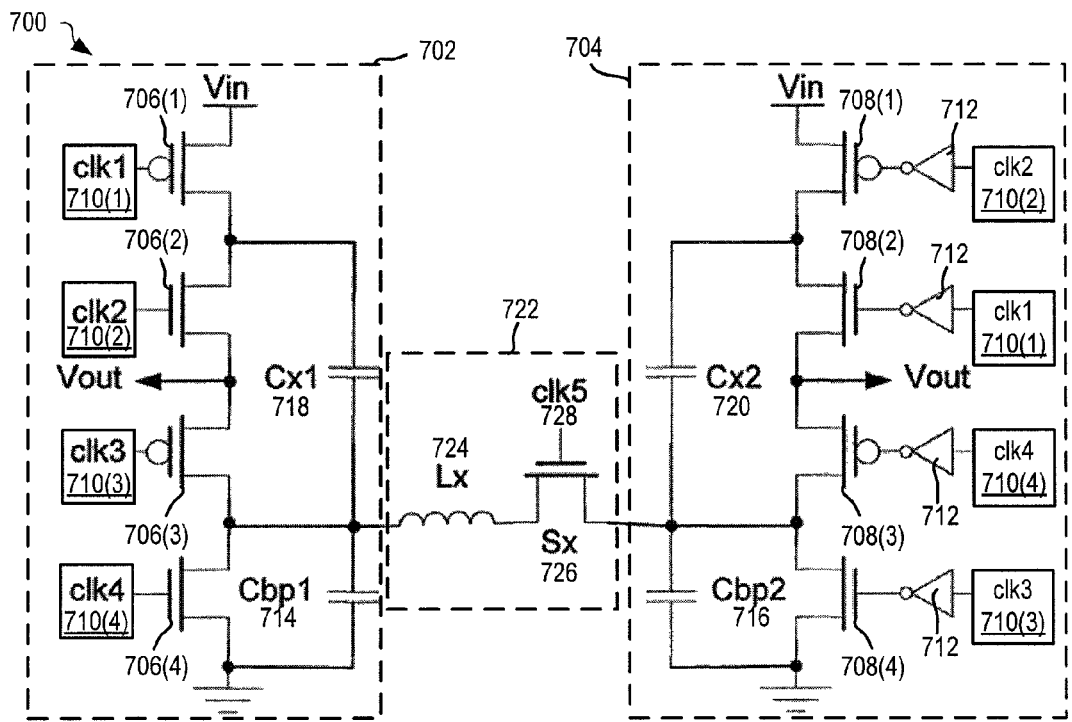
FIG. 7 depicts an exemplary system for reducing power loss in switched-capacitor power converters utilizing a resonant charge sharing scheme, in one embodiment.

FIG. 7 depicts an exemplary system 700 for reducing power loss in switched-capacitor power converters utilizing a resonant charge sharing portion 722, in one embodiment. System 700 includes a first switched-capacitor sub-converter 702 and a second switched-capacitor sub-converter 704 similar thereto. First and second switched-capacitor sub-converters 702, 704 are similar to first and second switched-capacitor sub-converters 502, 504, discussed above. First switched-capacitor sub-converter 702 includes a plurality of first switching devices 706. For example, a first switch 706(1) of the plurality of first switching devices 706 is electrically coupled between an input node and a first flying node, and a second switch 706(2) is electrically coupled between the flying node and an output node, the third switch 706(3) is electrically coupled between the output node and a second flying node, and a fourth switch 706(4) is electrically coupled between the output node and ground. Second switched-capacitor sub-converter 702 has a similar architecture including a plurality of second switching devices 708. Within the disclosure herein, switching device may be an n-channel or p-channel FET transistor, as illustrated in FIG. 7, or may alternatively be any other type of switching device known in the art such as a different type of FET, a BJT, an IGBT, etc.

For example, in the embodiment illustrated in FIG. 7, each switched-capacitor sub-converter 702, 704 includes two pMOS transistors and two nMOS transistors in one embodiment. Each one of the plurality of first and second switching devices 706, 708 is independently controlled by a clock signal 710. Second switched-capacitor sub-converter 704 further includes a plurality of inverters 712 and the clock signals 710 controlling switches 708 are configured such that second switched capacitor sub-converter 704 operates 180 degrees out of phase as compared to first switched-capacitor sub-converter 702. Each of first and second switched-capacitor sub-converters further include a first ($C_{bp1}$) and second ($C_{bp2}$) bottom-plate parasitic capacitance 714, 716, respectively, as well as a first and second flying capacitor 718, 720, respectively.

System 700 further includes a resonant charge sharing portion 722 including an inductor 724 (Lx) connected in series with a switch 726. Resonant charge sharing portion 722 is coupled between first bottom-plate parasitic capacitance 714 and second bottom-plate parasitic capacitance 716. Switch 726 is controlled by clock signal 728 such that, during an interval between each change in phase (i.e. during the transition from phase 1 to phase 2, and the transition from phase 2 to phase 1 as discussed in further detail below with reference to FIG. 8), clock signal 728 turns switch (Sx) 726 to "On." During this "On" time, one of first and second bottom-plate parasitic capacitances 714, 716 is charged substantially to $V_{out}$ and the other to zero volts. Charge flows through inductor 724, storing energy in inductor 724. If and when the voltage potential across whichever of first and second bottom-plate parasitic capacitances 714, 716 that was initially charged to $V_{out}$ is substantially equal to zero volts, or below some other predetermined threshold, clock signal 728 controls switch 726 to "off." The above charge transfer process is essentially a resonant process as it requires transferring energy from the electrostatic domain to the magnetic domain and then back to the electrostatic domain.

Within system 700, assuming the resistance of switch 726 is small, the energy transfer theoretically has 100% efficiency because the energy within bottom-plate parasitic capacitances 714, 716 is transferred between first and second switch-capacitor converter 702, 704 without loss.

In one embodiment, clock signal 728 is controlled such that the time that clock signal 728 controls switch 726 in the "on" state is substantially equal to ½ of the resonant period for the loop that contains the first bottom-plate parasitic capacitance 714, the inductor 724 and the second bottom-plate parasitic capacitance 716. For example, the resonant frequency of such loop is as follows:

$$f_0 = \frac{1}{2\pi\sqrt{L_R C_R}},\qquad\text{Equation [5]}$$

where $L_R$ and $C_R$ are the inductance and capacitance respectively of the loop. $L_R$ is substantially equal to the inductance of inductor 724 and $C_R$ is substantially equal to $$\frac{1}{2}C_{bp1} = \frac{1}{2}C_{bp2}$$

in the embodiment where $C_{bp1}=C_{bp2}$ The resonant period is $1/f_0$, therefore the time that switch 726 is in the "on" state is substantially equal to $1/(2 \cdot f_0)$, or $\pi\sqrt{L_x C_{bp}/2}$, where $C_{bp}$ is the bottom-plate parasitic capacitance of either $C_{bp1}$ 714 or $C_{bp2}$ 716. In an embodiment where $C_{bp1} \neq C_{bp2}$, then switch 726 would be in the "on" state for a time represented by $$\pi\sqrt{L_x \frac{C_{bp1} C_{bp2}}{C_{bp1} + C_{bp2}}}.$$

Although system 700 is illustrated as transferring energy from the bottom-plate parasitic capacitance, system 700 may equally apply for the top plate parasitic capacitance. For example, the parasitic drain-bulk capacitance of the MOSFET switches (e.g. switches 706) represents a significant common-mode capacitance in many cases and may be lumped into bottom-plate parasitic capacitance $C_{bp1}$ 714 and bottom-plate parasitic capacitance $C_{bp2}$ 716. Also, because flying capacitors 718 and 720 are usually significantly larger in magnitude than $C_{bp1}$ 714 and $C_{bp2}$ 716, they act as a short circuit at high frequency which enables transferring charge also for the top-plate common-mode capacitance ($C_{tp}$). Similarly, this enables resonant charge transfer not only for the parasitic capacitance of the switches 706 controlled by clock signal 710(3) and clock signal 710(4), but also those controlled by clock signal 710(1) and clock signal 710(2).

Figure 8:
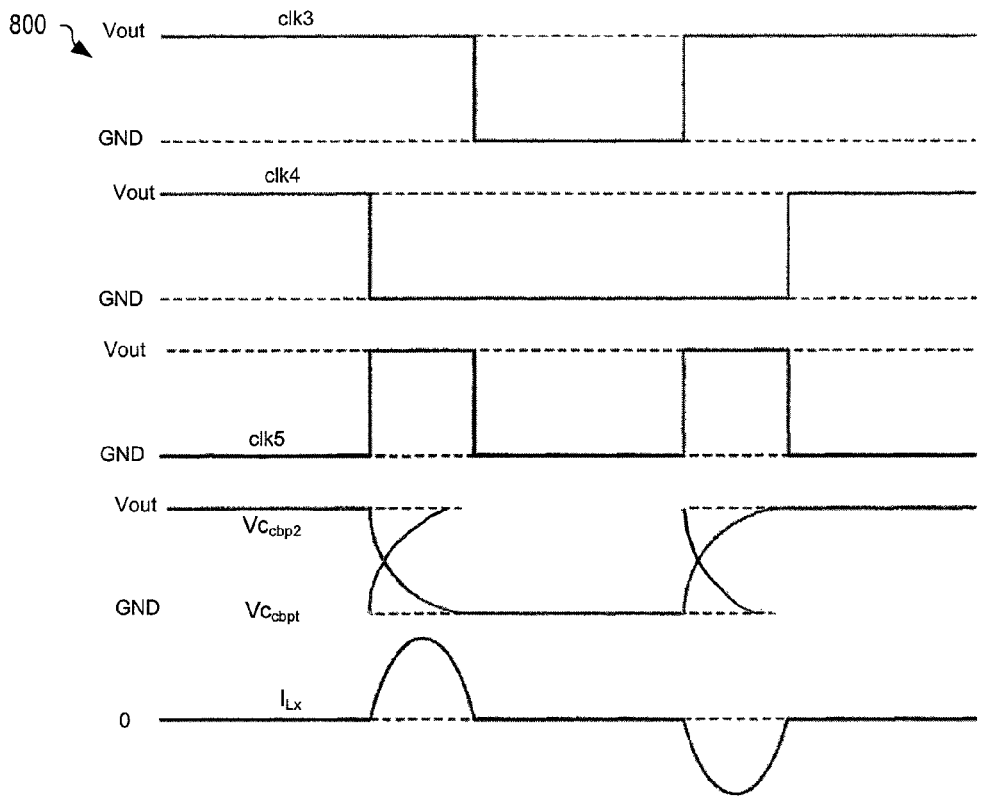
FIG. 8 depicts a signal timing and waveform diagram for the system of FIG. 7, in an embodiment.

FIG. 8 depicts a signal timing and waveform diagram 800 for system 700, of FIG. 7 during a transition from a first phase to a second phase. As discussed above, when clock signal 728 (clk5) is high, current flows through inductor 724 to transfer energy between capacitance $C_{bp1}$ 714 and capacitance $C_{bp2}$ 716. The current is approximately sinusoidal in this time period because the resonant operation of the charge sharing portion 722. In an ideal case, wherein there is negligible or zero resistance in the resonant loop consisting of inductor 724 and first and second bottom-plate parasitic capacitances 714, 716, and switch 726, system 700 can transfer energy with substantially zero loss. However, if there is series resistance in the resonant loop, the charge transfer process will incur some power loss. However, unlike the prior art systems discuss with regards to FIGS. 1-6, system 700 will typically recover 50% or greater energy stored within the bottom-plate parasitic capacitances 714, 716.

The resonant charge sharing process occurs during a time period when all switches 706(1-4) and 708(1-4) are off. During this time, clock signal 728 transitions high, turning on switch 726. At this same time, clock signal 710(1) is high such that switches 706(1) and 708(2) are off; clock signal 710(2) is low such that switches 706(2) and 708(1) are off; clock signal 710(3) is high such that switches 706(3) and 708(4) are off; clock signal 710(4) is low such that switches 706(4) and 708(3) are off. Therefore, because switches 706 and 708 are off, the only path for current to flow when switch 726 is on, is through inductor 724, which transfers charge between capacitor $C_{bp1}$ and $C_{bp2}$.

It should be noted that there is normally a substantial time delay between the time when clock signal 710(2) and clock signal 710(4) transition from high to low and the time when clock signal 728 transitions from low to high. This is to prevent overlap of the on-state of switches 706(2), 706(4), 708(1), and 708(3) with the on-state of switch 726. This time delay is normally referred to as a "dead-time" as all switches are off during this time period. The dead-time is normally substantially shorter than any of the time periods when switches are on. Similarly, there is some dead-time between the time when clock signal 728 transitions low and the time when clock signal 710(1) and clock signal 710(3) transition low to prevent overlap of the on-state of switches 706(1), 706(3), 708(2), and 708(4) with the on-state of switch 726.

Figure 1:
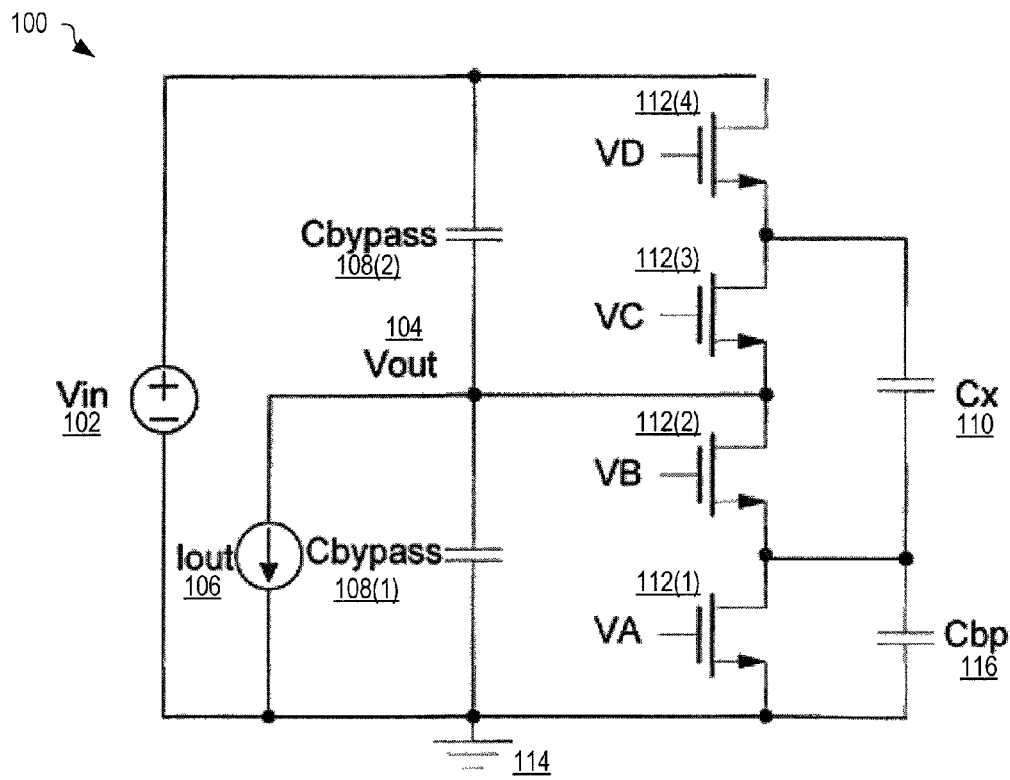
FIG. 1 depicts an exemplary prior art 2:1 switched-capacitor converter.
Figure 2:
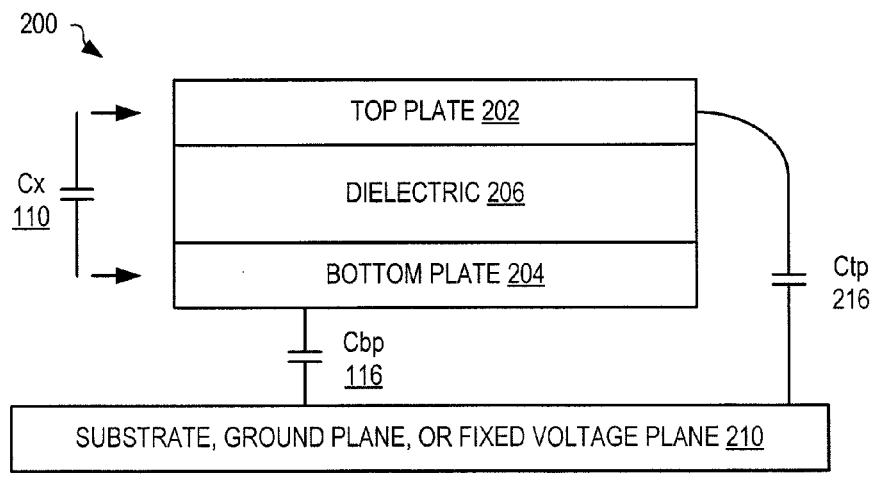
FIG. 2 depicts an exemplary prior art physical representation of the flying capacitor Cx, of FIG. 1.
Figure 3:
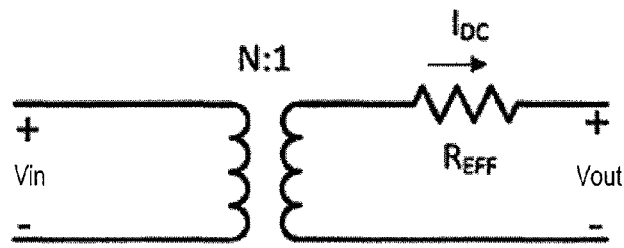
FIG. 3 depicts a common representation for a switched capacitor voltage conversion element.
Figure 4:
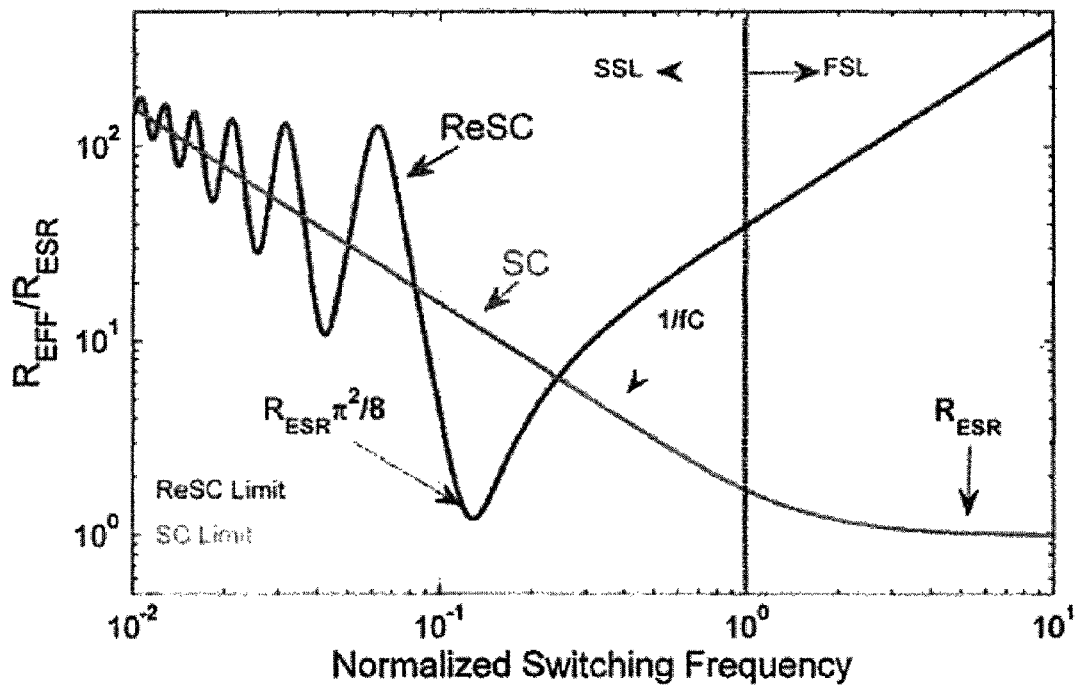
FIG. 4 is a prior-art graph depicting effective resistance normalized to effective series resistance versus frequency for switched-capacitor and ReSC converters.
Figure 5A:
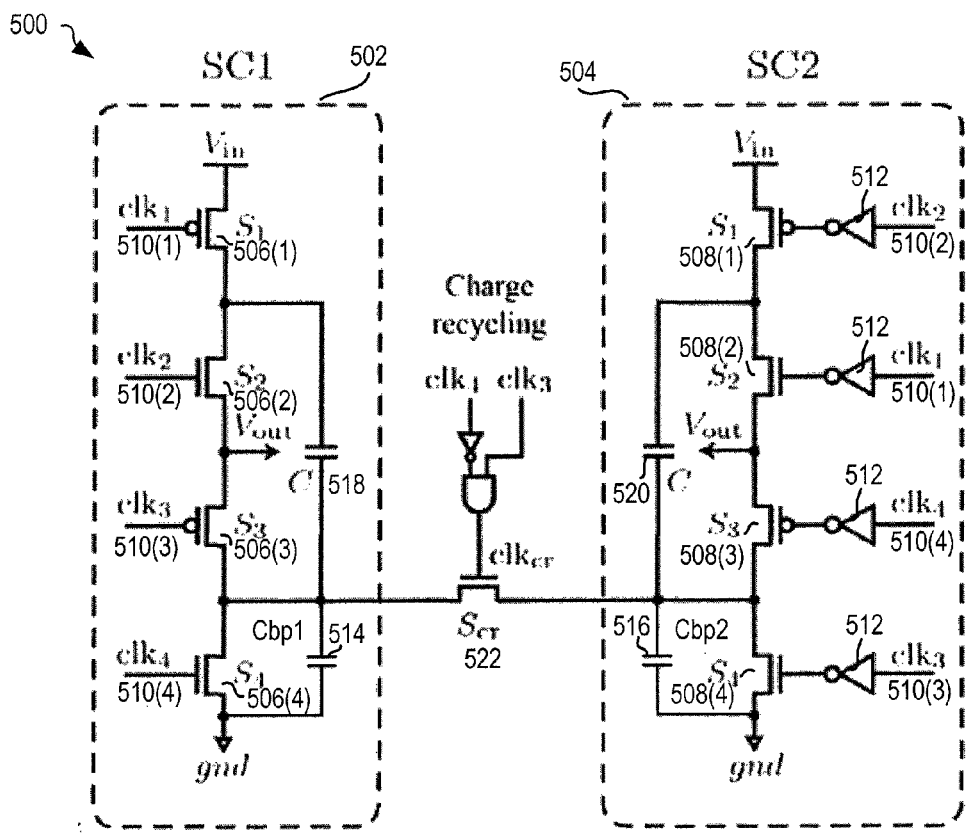
FIG. 5A depicts a prior-art multi-phase switched-capacitor converter including a charge recycling system.
Figure 5B:
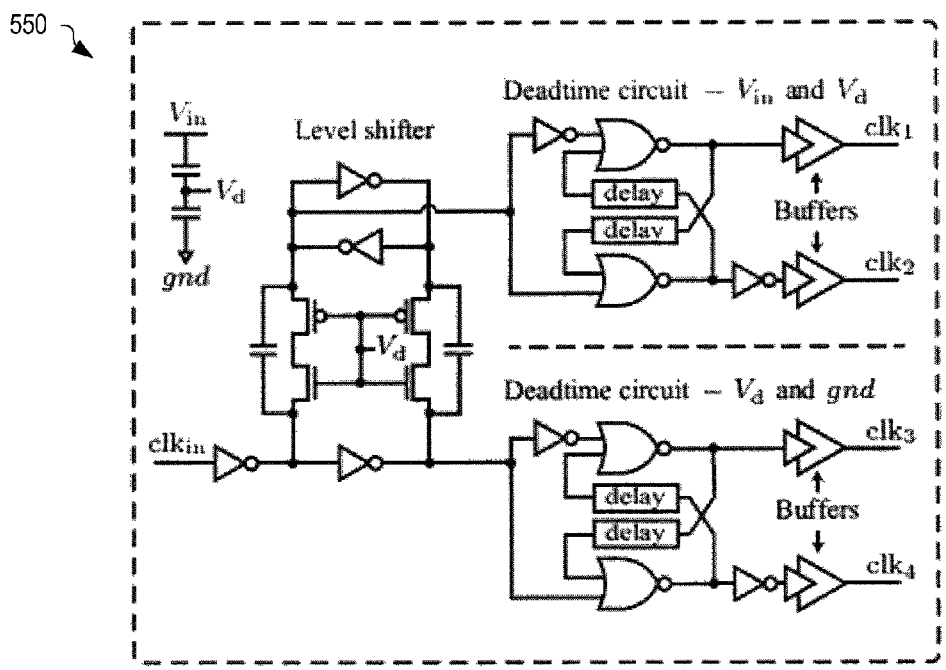
FIG. 5B illustrates an exemplary gate driver circuit for generating signals clk1 through clk4 to drive the charge recycling system of FIG. 5A.
Figure 6:
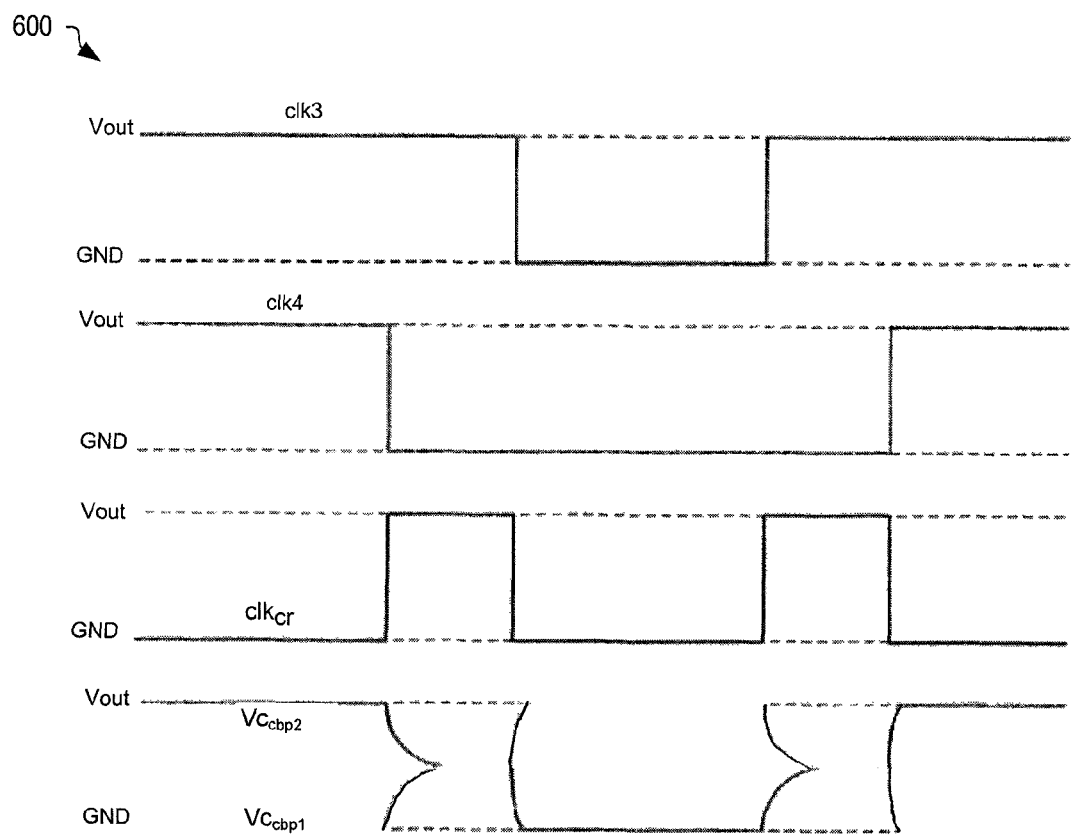
FIG. 6 depicts a timing diagram of signal waveforms for the charge recycling system of FIG. 5A.
Figure 9:
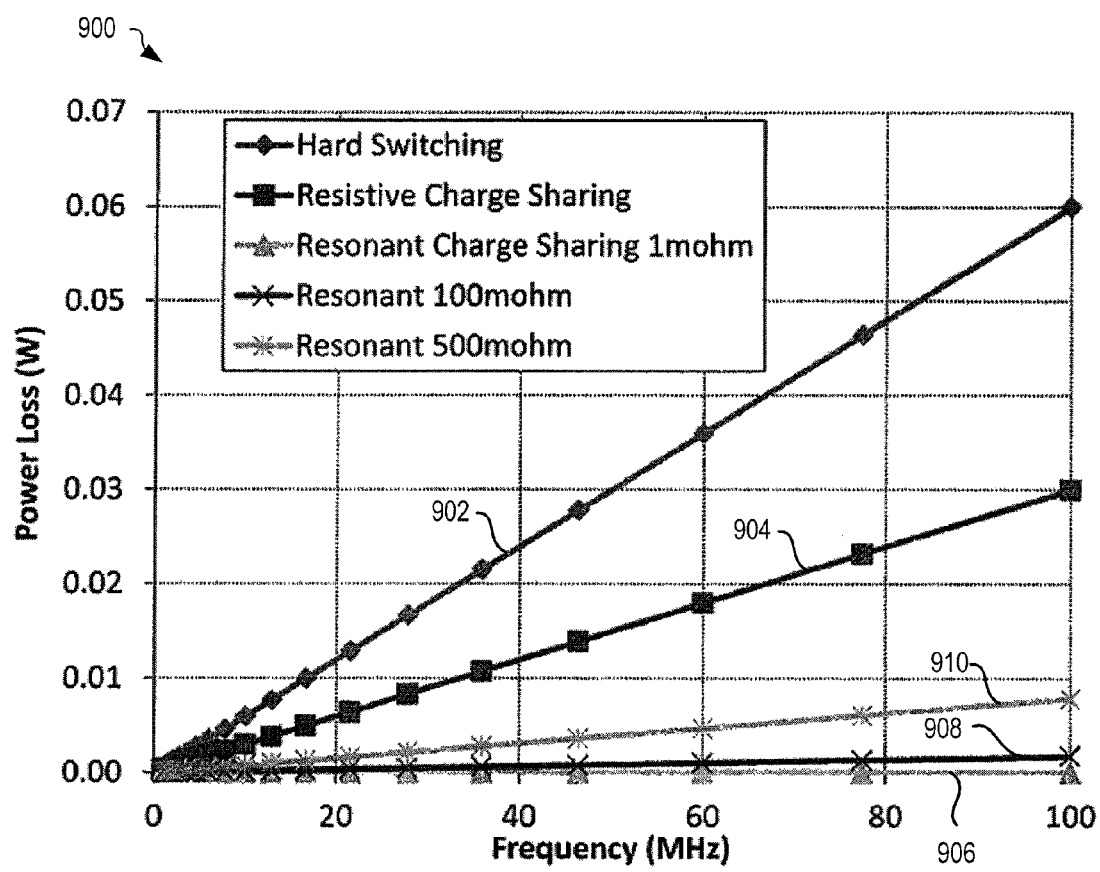
FIG. 9 depicts a power loss graph depicting power loss versus frequency of switch-capacitor converters in cases of hard switching, resistive charge sharing, and resonant charge sharing.

FIG. 9 depicts a power loss graph 900 depicting power loss versus frequency for (i) prior art hard switching of bottom-plate parasitic capacitance, of FIGS. 1-2, 902 (ii) prior art resistive charge sharing of FIG. 5, 904, (iii) the resonant charge sharing of system 700 at 1 mΩ, of FIG. 7, 906, (iv) the resonant charge sharing of system 700 at 100 mΩ, of FIG. 7, 908, and (v) the resonant charge sharing of system 700 at 500 mΩ, of FIG. 7, 910 as generated with SPICE simulation. The simulation considers a SC converter with bottom-plate parasitic capacitance of 300 pF in a configuration similar to FIG. 7 above. The $V_{in}$ is 2.0V, and $V_{out}$ is 1.0V in an ideal case.

In the traditional case 902, (i.e. FIG. 1 where the bottom-plate capacitors are hard switched between $V_{out}$ and GND), the power loss is $(C_{pb1}+C_{bp2})V_{out}^2 f_{sw}$. At $f_{sw}$=100 MHz, and the power loss to bottom-plate parasitic capacitance is substantially 60 mW. In the prior art case 904 (i.e. FIG. 5), the power loss at 100 MHz is 30 mW.

Within the embodiment described in FIG. 7, if the series resistance, in the resonant charge sharing portion 722 comprising capacitance 714, capacitance $C_{bp2}$ 716, inductor $L_x$ 724 and switch $S_x$ 726, is substantially zero (i.e. case 906) the power loss due to bottom-plate parasitic capacitance is substantially zero for all switching frequencies. In case 906, the power loss is shown for the total resistance in resonant charge sharing portion 722 being 100 mΩ. In case 908, the power loss is shown for the total resistance in resonant charge sharing portion 722 being 500 mΩ. In all three cases 906, 908, 910, it is clearly illustrated that the embodiments herein potentially substantially reduce power loss compared to the prior art.

Figure 10:
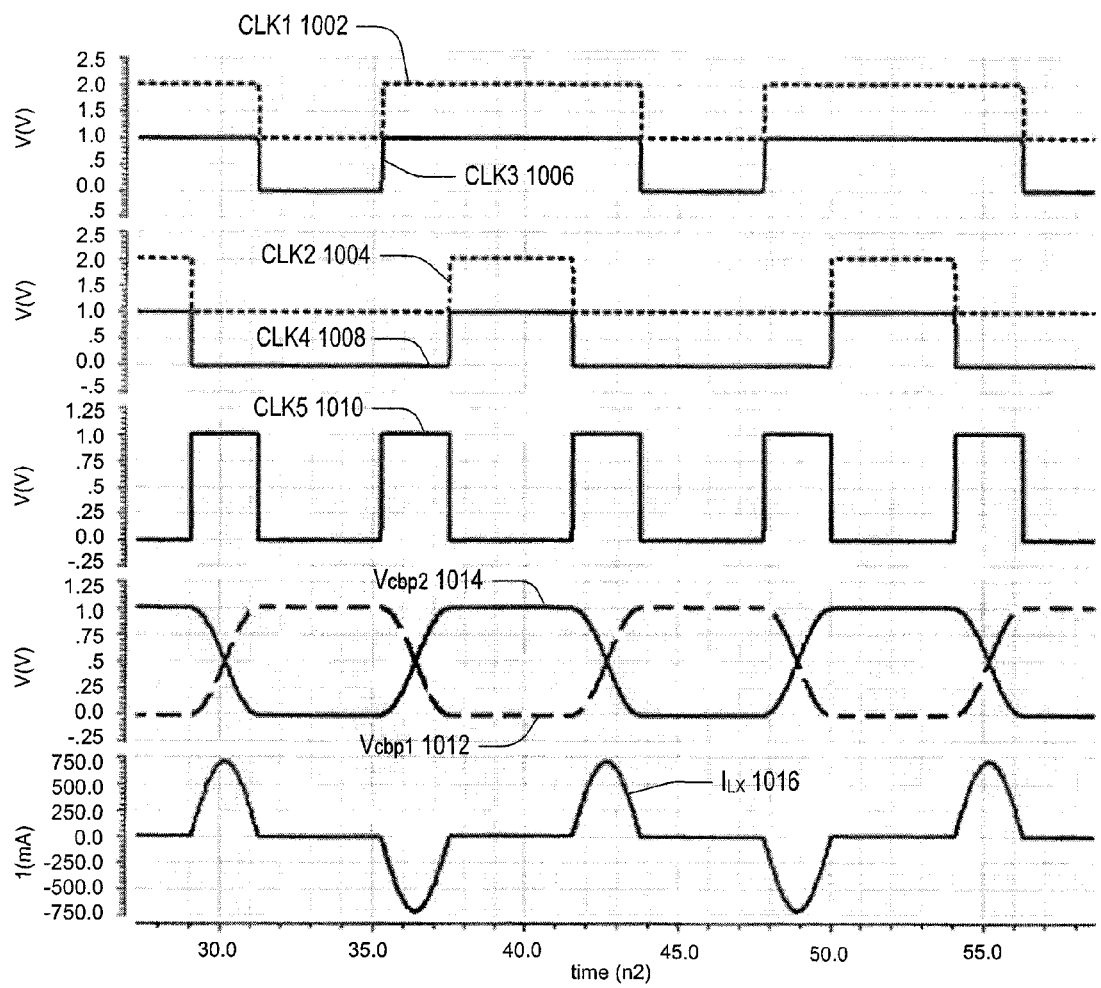
FIG. 10 depicts exemplary simulation results generated in a SPICE simulation for the converter in FIG. 7.

FIG. 10 depicts exemplary simulation results generated in a SPICE simulation for the converter in FIG. 7. The SPICE simulation depicts the following signals: clk1 1002, clk2 1004, clk3 1006, clk4 1008, clk5 1010, $Vc_{bp1}$ 1012, $Vc_{bp2}$ 1014, and the current signal $I_{Lx}$ 1016. In the simulation, $V_{in}$ was substantially 2 volts, $V_{out}$ was substantially 1 volt, $C_{bp1}$ and $C_{bp2}$ were each 1 nF, inductor 724 was 1 nH, and the switching frequency was substantially 80 MHz. The values for Lx, $C_{bp1}$ and $C_{bp2}$ were set such that they predict a resonant frequency of substantially 225 MHz, which is consistent with the duration of the pulse with of clock signal 728 in the high-state which is substantially 2.2 ns or half the resonant period for a 225 MHz signal. The simulation models the resistance in series with inductor 724 as 1 mΩ and it can be seen that will small resistance in the resonant path that substantially all of the energy in bottom-plate parasitic capacitance 714 can be transferred to bottom-plate parasitic capacitance 716 and vice versa.

Figure 11:
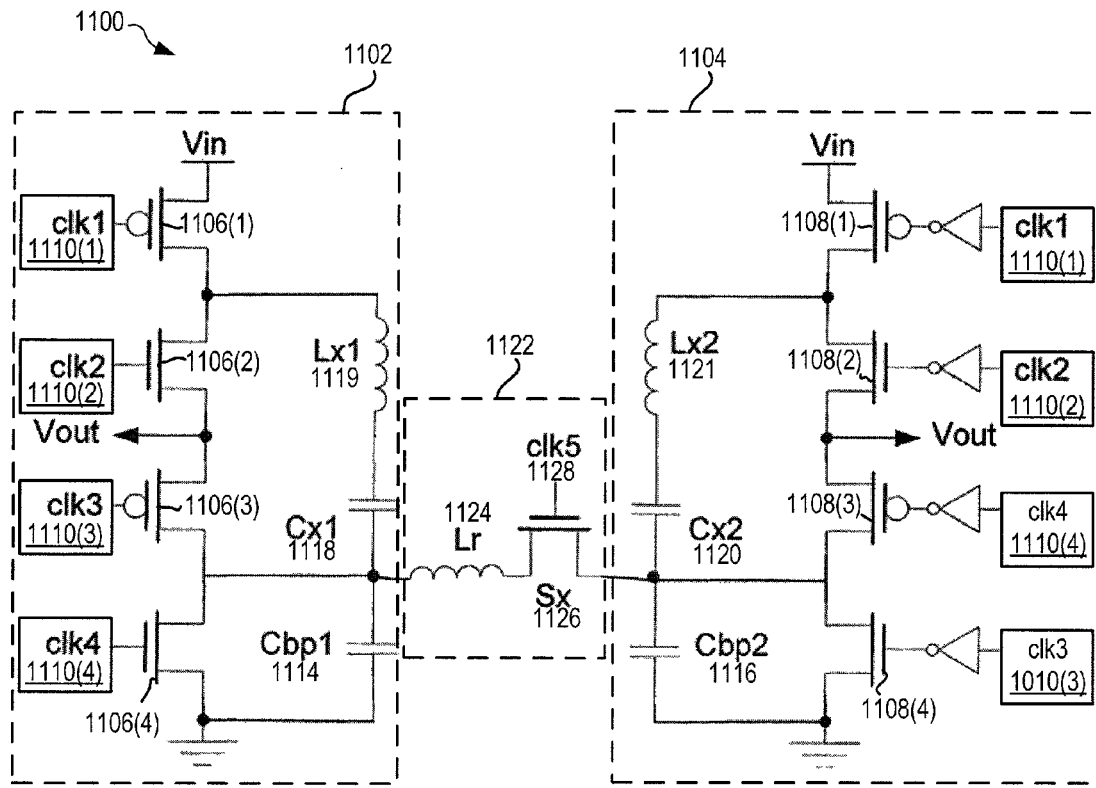
FIG. 11 depicts an alternate system for reducing power loss in a ReSC converter, in one embodiment.

FIG. 11 depicts an alternate system 1100 for reducing power loss in a ReSC converter, in one example. System 1100 includes a first ReSC sub-converter 1102 and a second ReSC sub-converter 1104. First switched capacitor sub-converter 1102 is similar to first switched capacitors above (502, 702) and includes a plurality of transistors 1106, a first flying capacitor 1118 and a first bottom-plate parasitic capacitance 1114. First switched capacitor sub-converter 1102 differs from the above described first switched capacitors 502, 702 in that first switched capacitor sub-converter 1102 is a resonant switched capacitor converter. The resonant characteristic is caused by a first resonant inductor 1119 coupled in series between first flying capacitor 1118 and the drain of first transistor 1106(1).

Second resonant switched capacitor sub-converter 1104 is similar to first switched capacitor sub-converter 1102 in that it is resonant (i.e. sub-converter 1104 includes a second resonant inductor 1121 coupled in series between the drain of transistor 1108(1) and flying capacitor 1120.

System 1100 further includes a resonant charge sharing portion 1122 having an inductor 1124 and a switch 1126. Resonant charge sharing portion 1122 operates in a similar manner as discussed above with regards to resonant charge sharing portion 722. For example, each of first and second resonant switched capacitor sub-converters 1102, 1104 operate at 180 degrees out of phase with each other. Switch 1126 is controlled via a clock signal (clk5) 1128. Inductor 1124, switch 1126, and clock signal 1128 within resonant charge sharing portion 1122 are similar to inductor 724, switch 726, and clock signal 728, respectively, within resonant charge sharing portion 722, discussed above.

System 1100 offers the benefit of the resonant switched capacitor converter architecture as opposed to the architecture of system 700, as well as the prior art. Therefore, system 1100 is able to operate with nearly the same effective resistance as an equivalent SC converter (i.e. system 700) with the same total capacitance, but at a lower frequency. The addition of the resonant charge sharing portion 1122 enables a typical resonant switched capacitor converter architecture to operate with substantially less bottom-plate switching loss, for example less than 50%, as discussed with regards to FIGS. 7-8, above.

Figure 12:
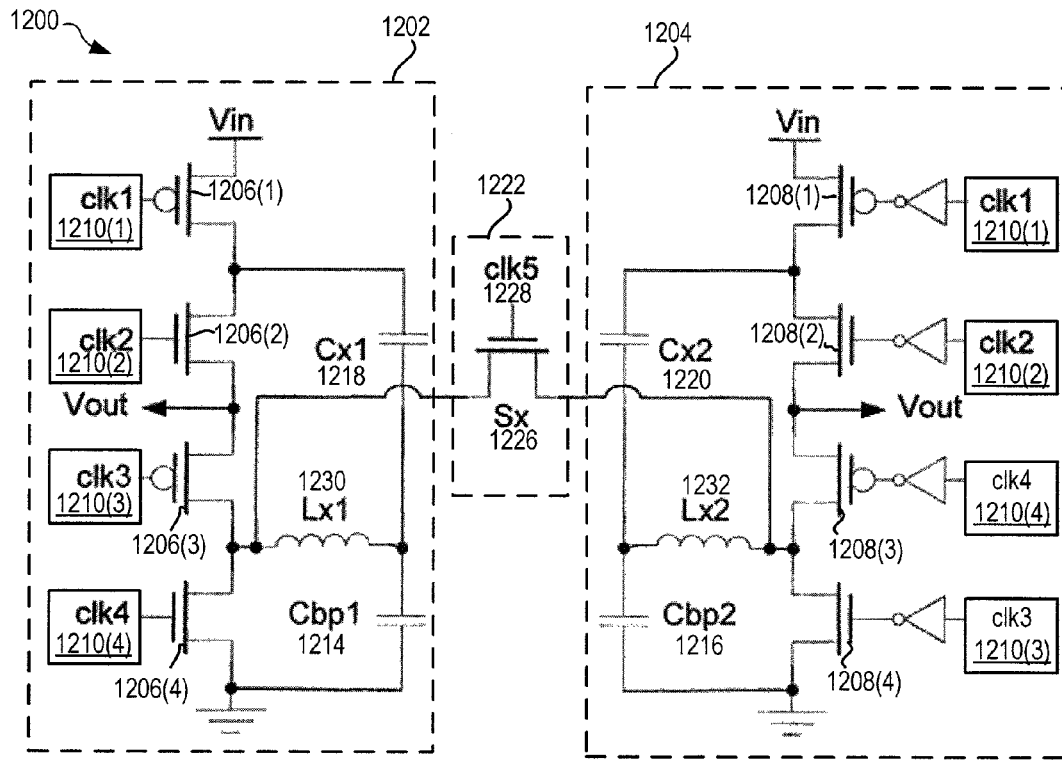
FIG. 12 depicts an alternate system for reducing power loss in a ReSC power converter, in one embodiment.

FIG. 12 depicts an alternate system 1200 for reducing power loss in a ReSC power converter, in one example. System 1200 includes a first resonant switched capacitor sub-converter 1202 and a second resonant switched capacitor sub-converter 1204. Resonant switched capacitor sub-converters 1202 and 1204 are similar to resonant switched capacitor sub-converters 1102 and 1104 however resonant switched capacitor sub-converters 1202 and 1204 do not include a resonant inductor in series with the flying capacitor. Instead, first and second resonant switched capacitor sub-converters 1202 and 1204 each include a respective first and second resonant inductor 1230, 1232 coupled to the flying capacitor 1218, 1220, respectively. I.e. first resonant inductor 1230 is coupled to the drain of third transistor 1206(3) and the node between flying capacitor 1218 and bottom-plate capacitor 1214. Second resonant inductor 1232 is coupled to the drain of third transistor 1208(3) and the note between flying capacitor 1220 and bottom-plate capacitor 1216.

System 1200 includes resonant charge sharing portion 1222 which includes switch 1226 controlled via clock signal 1228. Unlike resonant charge sharing portion 722, 1122, discussed above, resonant charge sharing portion 1222 does not include an inductor (i.e. inductors 724, 1124). Instead, resonant charge sharing portion 1222 utilizes resonant inductors 1230, 1232 within first and second resonant switched capacitor sub-converters 1202, 1204.

The time interval in which switch 1226 is turned "on", i.e. via control by clock signal 1228 is determined by the following:

$$\pi \sqrt{(L_{x1} + L_{x2}) \frac{C_{bp1} * C_{bp2}}{C_{bp1} + C_{bp2}}} .$$

Equation [6]

Also in this configuration, the parasitic top plate capacitance may be lumped into $C_{bp1}$ and $C_{bp2}$. The parasitic common-mode capacitance connected to the drain terminals of switches controlled by clock signals 1210(1) and 1210(2) may additionally be lumped into the bottom-plate parasitic capacitances. However, because switch 1226 is directly connected between the drain terminals of switches controlled by clock signals 1210(3) and 1210(4), the configuration shares charge between the parasitic common mode capacitance at the drain terminals of these switches.

Features described above as well as those claimed below may be combined in various ways without departing from the scope hereof. The following examples illustrate some possible, non-limiting combinations:

(A1) A system for reducing power loss in a switched-capacitor converter may include a first and second switched capacitor sub-converter each having a first, second, third, and fourth switching device each controlled by one of a first, second, third, and fourth clock signal, and a flying capacitor, wherein the first, second, third and fourth clock signals of the second switched capacitor sub-converter are inverted such that the first switched capacitor sub-converter operates during a first phase and the second switched capacitor converter operates during a second phase that is 180 degrees out of phase from the first phase; and, a resonant charge sharing portion for coupling a bottom-plate parasitic capacitance of the first switched capacitor sub-converter to a bottom-plate parasitic capacitance of the second switched capacitor converter.

(A2) In the system denoted above as (A1), the resonant charge sharing portion may include a sharing inductor coupled in series with a sharing switch.

(A3) In any of the systems denoted above as (A1) through (A2), the capacitance value of the bottom-plate parasitic capacitance may be the same for each of the first and second switched capacitor sub-converters, and the sharing switch may be in an on mode for a length of time defined by $\pi\sqrt{L_s C_{bp}/2}$ where $L_s$ is the inductance of the sharing inductor and $C_{bp}$ is the bottom-plate parasitic capacitance value of at least one of the first and second switched capacitor sub-converters.

(A4) In either system denoted above as (A1) and (A2), the capacitance value of the bottom-plate parasitic capacitance is not equal for each of the first and second switched capacitors, and the sharing switch is in an on mode for a length of time is defined by $$\pi\sqrt{L_s \frac{C_{bp1} * C_{bp2}}{C_{bp1} + C_{bp2}}},$$

where $L_s$ is the inductance of the sharing inductor, $C_{bp1}$ is the bottom-plate parasitic capacitance value of the first switched capacitor sub-converter, and $C_{bp2}$ is the bottom-plate parasitic capacitance value of the second switched capacitor sub-converter.

(A5) In any of the systems denoted above as (A1) through (A4), the first and second switched capacitor converters may be resonant such that a resonant inductor is coupled in series with the flying capacitor.

(A6) In any of the systems denoted above as (A1) through (A5), within each first and second switched capacitor converters, the first switching device may be electrically coupled between an input node and a first flying node, the second switching device may be electrically coupled between the first flying node and an output node, the third switching device may be electrically coupled between the output node and a second flying node, and the fourth switching device may be electrically coupled between the second flying node and ground.

(A7) In the system denoted above as (A6), within each of the first and second switched capacitor converters, the flying capacitor may be electrically coupled between each of the first and second flying nodes, and a bottom-plate parasitic capacitance may be between the second flying node and ground.

(A8) In either of the systems denoted above as (A6) and (A7), within each of the first and second switched capacitor converters, a resonant inductor may be coupled in series with the flying capacitor between first flying node and the flying capacitor.

(A9) In any of the systems denoted above as (A6) through (A8), within each of the first and second switched capacitor converters, a resonant inductor may be coupled between the second flying node and the flying capacitor.

(A10) In any the systems denoted above as (A1) through (A9), the resonant charge sharing portion may include a sharing switch, controlled via a fifth clock signal, coupled to the second flying node, within each of the first and second switched capacitor converters.

(A11) In the system denoted as (A10), the sharing switch may be in an on state, as determined by the fifth clock signal, for a length of time defined by $$\pi\sqrt{(L_{x1} + L_{x2})\frac{C_{bp1} * C_{bp2}}{C_{bp1} + C_{bp2}}},$$

where $L_{x1}$ is the inductance value of the resonant inductor of the first switched capacitor converter, $L_{x2}$ is the inductance value of the resonant inductor of the second switched capacitor converter, $C_{bp1}$ is the capacitance value of the bottom-plate parasitic capacitance of the first switched capacitor converter, and $C_{bp2}$ is the capacitance value of the bottom-plate parasitic capacitance of the second switched capacitor converter.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A system for reducing power loss in a switched-capacitor converter, the system comprising:
 a first and second switched capacitor sub-converter each having
  a first, second, third, and fourth switching device each controlled by one of a first, second, third, and fourth clock signal, and
  a flying capacitor,
  wherein the first, second, third and fourth clock signals of the second switched capacitor sub-converter are inverted such that the first switched capacitor sub-converter operates during a first phase and the second switched capacitor converter operates during a second phase that is 180 degrees out of phase from the first phase; and,
 a resonant charge sharing portion for coupling a bottom-plate parasitic capacitance of the first switched capacitor sub-converter to a bottom-plate parasitic capacitance of the second switched capacitor converter.

2. The system of claim 1, the resonant charge sharing portion comprising a sharing inductor coupled in series with a sharing switch.

3. The system of claim 2, wherein
 a capacitance value of the bottom-plate parasitic capacitance is the same for each of the first and second switched capacitor sub-converters, and
 the sharing switch is in an on mode for a length of time defined by $\pi\sqrt{L_s C_{bp}/2}$
 where $L_s$ is an inductance of the sharing inductor and $C_{bp}$ is the bottom-plate parasitic capacitance of at least one of the first and second switched capacitor sub-converters.

4. The system of claim 2, wherein
 a capacitance value of the bottom-plate parasitic capacitance is not equal for each of the first and second switched capacitors, and
 the sharing switch is in an on mode for a length of time is defined by $$\pi\sqrt{L_s \frac{C_{bp1} * C_{bp2}}{C_{bp1} + C_{bp2}}},$$

where $L_s$ is the inductance of the sharing inductor, $C_{bp1}$ is the bottom-plate parasitic capacitance value of the first switched capacitor sub-converter, and $C_{bp2}$ is the bottom-plate parasitic capacitance value of the second switched capacitor sub-converter.

5. The system of claim 1, the first and second switched capacitor converters being resonant such that a resonant inductor is coupled in series with the flying capacitor.

6. The system of claim 1, wherein, within each first and second switched capacitor converters, the first switching device is electrically coupled between an input node and a first flying node, the second switching device is electrically coupled between the first flying node and an output node, the third switching device is electrically coupled between the output node and a second flying node, and the fourth switching device is electrically coupled between the second flying node and ground.

7. The system of claim 6, wherein, within each of the first and second switched capacitor converters, the flying capacitor is electrically coupled between each of the first and second flying nodes, and a bottom-plate parasitic capacitance is between the second flying node and ground.

8. The system of claim 7, wherein, within each of the first and second switched capacitor converters, a resonant inductor is coupled in series with the flying capacitor between first flying node and the flying capacitor.

9. The system of claim 7, wherein, within each of the first and second switched capacitor converters, a resonant inductor is coupled between the second flying node and the flying capacitor.

10. The system of claim 9, wherein the resonant charge sharing portion comprises a sharing switch, controlled via a fifth clock signal, coupled to the second flying node, within each of the first and second switched capacitor converters.

11. The system of claim 10, wherein the sharing switch is in an on state, as determined by the fifth clock signal, for a length of time defined by $$\pi \sqrt{(L_{x1} + L_{x2}) \frac{C_{bp1} * C_{bp2}}{C_{bp1} + C_{bp2}}},$$

where $L_{x1}$ is the inductance value of the resonant inductor of the first switched capacitor converter, $L_{x2}$ is the inductance value of the resonant inductor of the second switched capacitor converter, $C_{bp1}$ is the capacitance value of the bottom-plate parasitic capacitance of the first switched capacitor converter, and $C_{bp2}$ is the capacitance value of the bottom-plate parasitic capacitance of the second switched capacitor converter.

* * * * *